(12) United States Patent
Dalmiya et al.

(10) Patent No.: US 12,069,558 B2
(45) Date of Patent: Aug. 20, 2024

(54) SECONDARY CELL GROUP (SCG) FAILURE PREDICTION AND TRAFFIC REDISTRIBUTION

(71) Applicant: QUALCOMM Incorporated, San Diego, CA (US)

(72) Inventors: Vishal Dalmiya, San Diego, CA (US); Vaishakh Rao, San Diego, CA (US); Kuo-Chun Lee, San Diego, CA (US); Leena Zacharias, San Jose, CA (US); Vanitha Aravamudhan Kumar, San Diego, CA (US); Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 17/524,581

(22) Filed: Nov. 11, 2021

(65) Prior Publication Data

US 2023/0145079 A1    May 11, 2023

(51) Int. Cl.
*H04W 40/18* (2009.01)
*G06N 20/00* (2019.01)
*H04W 24/04* (2009.01)

(52) U.S. Cl.
CPC .......... *H04W 40/18* (2013.01); *G06N 20/00* (2019.01); *H04W 24/04* (2013.01)

(58) Field of Classification Search
CPC ....... H04W 40/18; H04W 24/04; G06N 20/00
USPC ....................................................... 370/328
See application file for complete search history.

(56) References Cited

U.S. PATENT DOCUMENTS

| | | | |
|---|---|---|---|
| 11,244,242 B2* | 2/2022 | Prakash | G06F 18/2148 |
| 2015/0289171 A1* | 10/2015 | Jung | H04L 1/0001 |
| | | | 370/331 |
| 2019/0220703 A1* | 7/2019 | Prakash | G06V 10/95 |
| 2019/0229980 A1* | 7/2019 | Han | H04L 41/0668 |
| 2020/0128417 A1* | 4/2020 | Yoon | H04W 24/10 |
| 2020/0260518 A1* | 8/2020 | Orsino | H04W 76/38 |
| 2020/0280390 A1* | 9/2020 | Bagheri | H04L 1/0013 |
| 2021/0266811 A1* | 8/2021 | Hwang | H04W 28/06 |
| 2022/0095170 A1* | 3/2022 | Lindoff | H04W 24/08 |
| 2022/0201516 A1* | 6/2022 | Guo | H04W 72/0446 |
| 2023/0086398 A1* | 3/2023 | Teyeb | H04W 76/19 |
| 2023/0327790 A1* | 10/2023 | Da Silva | H04W 24/10 |
| | | | 455/67.11 |
| 2023/0345270 A1* | 10/2023 | Hong | H04W 76/15 |

FOREIGN PATENT DOCUMENTS

| | | | | |
|---|---|---|---|---|
| EP | 4145736 A1 * | 3/2023 | ........... | H04L 1/1812 |
| WO | WO-2022084457 A1 * | 4/2022 | ............. | G06N 20/00 |

* cited by examiner

*Primary Examiner* — Mong-Thuy T Tran
(74) *Attorney, Agent, or Firm* — QUALCOMM Incorporated

(57) ABSTRACT

A method of wireless communication, by a user equipment (UE), includes setting up a secondary cell group (SCG) with a second radio access technology (RAT) that differs from a first RAT associated with a master cell group (MCG). The method also includes communicating wirelessly via the secondary cell group and the master cell group. The method further includes predicting a radio link failure (RLF) for the secondary cell group based on multiple inputs to a machine learning model. The method still further includes routing data transmission from the secondary cell group to the master cell group, after predicting the SCG RLF.

27 Claims, 9 Drawing Sheets

SECONDARY CELL GROUP (SCG) FAILURE PREDICTION AND TRAFFIC REDISTRIBUTION

FIELD OF THE DISCLOSURE

The present disclosure relates generally to wireless communications, and more specifically to secondary cell group (SCG) failure prediction and traffic distribution in a nonstandalone (NSA) deployment.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

In aspects of the present disclosure, a method of wireless communication by a user equipment (UE), includes setting up a secondary cell group with a second radio access technology (RAT) that differs from a first RAT associated with a master cell group. The method also includes communicating wirelessly via the secondary cell group and the master cell group. The method further includes predicting a radio link failure (RLF) for the secondary cell group based on multiple inputs to a machine learning model. The method still further includes routing data transmission from the secondary cell group to the master cell group, after predicting the RLF for the secondary cell group.

Other aspects of the present disclosure are directed to an apparatus for wireless communication, by a user equipment (UE) having a memory and one or more processors coupled to the memory. The processor(s) is configured to set up a secondary cell group with a second radio access technology (RAT) that differs from a first RAT associated with a master cell group. The processor(s) is also configured to communicate wirelessly via the secondary cell group and the master cell group. The processor(s) is further configured to predict a radio link failure (RLF) for the secondary cell group based on multiple inputs to a machine learning model. The processor(s) is still further configured to route data transmission from the secondary cell group to the master cell group, after predicting the RLF for the secondary cell group.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this

DETAILED DESCRIPTION

Figure 1:
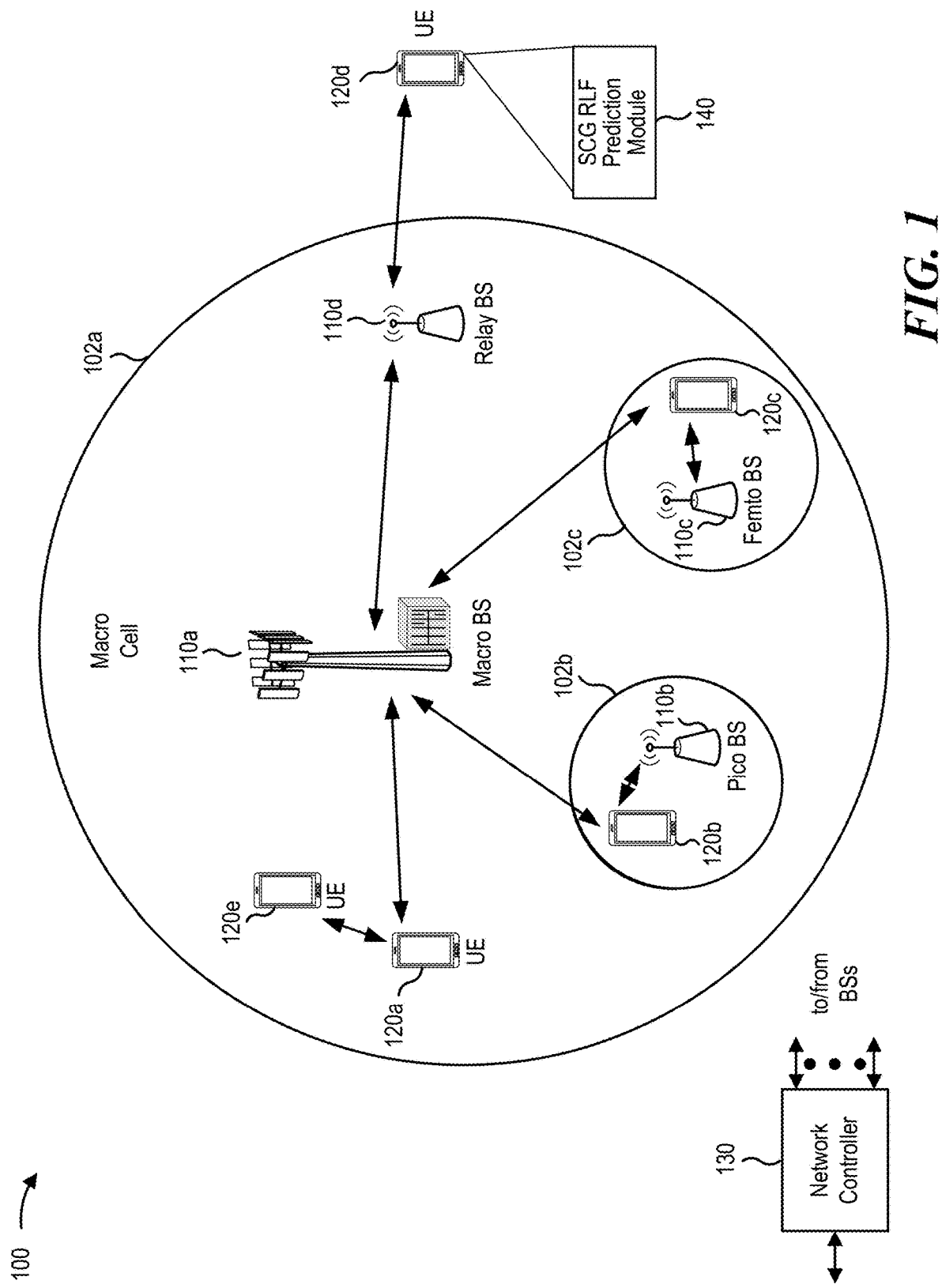
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In a 5G non-standalone (NSA) architecture, a user equipment (UE) may set up a secondary cell group (SCG) to allow mobile devices to simultaneously use two different radio access technologies. For example, the UE may communicate with both a 4G network and a 5G network in an evolved universal mobile telecommunications service (UMTS) terrestrial radio access network (E-UTRAN) new radio-dual c (EN-DC) architecture. A long term evolution (LTE) base station may operate as part of a master cell group (MCG) and a new radio (NR) base station may operate as part of a secondary cell group. By setting up the SCG, the UE may send and receive data on the 5G link in addition to the 4G link.

When a link in the secondary cell group is unreliable, for example, due to use of millimeter wave frequencies or a poor wireless environment, data transmission may suffer from a high error rate, such as a high block error rate (BLER). As a result, numerous retransmissions of unsuccessfully decoded data are sent, which may waste UE power and processing resources, such as central processing unit (CPU) resources, when communicating with the secondary cell group.

Currently, mechanisms are provided to detect secondary cell group failure and declare secondary cell group radio link failure (RLF). For example, Third Generation Partnership Project (3GPP) standards specify a signal strength threshold and a timer. When a signal strength falls below the threshold value for a duration of the timer, RLF is declared. Similarly, when a maximum number of radio link controller (RLC) retransmissions is reached, RLF may be declared. It would be desirable for secondary cell group failure to be detected before actual failure, so traffic may be moved to a master cell group in advance of RLF.

According to aspects of the present disclosure, a UE predicts RLF before a secondary cell group RLF condition occurs, for example, as specified by the standards. The UE may predict with any type of machine learning technique. Based on the prediction, the UE may signal the potential RLF condition to the network. The UE may also proactively reroute traffic from the SCG to the MCG, in response to the prediction. The prediction may occur a period of time, T, in advance of when the RLF will actually occur. The value T may be expressed as a number of slots (e.g., five slots) or an amount of time (e.g., 50 ms).

According to aspects of the present disclosure, a machine learning model receives input variables. Based on the input variables, the machine learning model predicts whether a secondary cell group RLF will occur at a time in the future. The machine learning model generates an alert based on the prediction.

For example, the input variables of the machine learning model may include a downlink block error rate (BLER) for the last D time slots, where D is a moving window. The input variables of the machine learning model may include an uplink block error rate in the last D time slots, where the moving window is the same or different from the moving window associated with the downlink block error rate. The input variables of the machine learning model may also include a current packet data convergence protocol (PDCP) number of holes in the receive window. Another input variable of the machine learning model may be a number of PDCP reordering timer expiration events that have occurred in the last D time slots. According to further aspects of the present disclosure, the input variables of the machine learning model may include a mean delay of radio link control (RLC) acknowledgements to new packet transmissions, in the last D time slots.

According to aspects of the present disclosure, the input variables of the machine learning model may further include downlink throughput and/or uplink throughput metrics. The input variables may also include a number of RLC retransmissions sent on the uplink. The input variables may also include a number of RLC negative acknowledgements (NACKs) sent for downlink data and/or RLC NACKs received for uplink data. In still other aspects, the input variables include a number of packets in a transmit window (e.g., buffer) and/or a receive window (e.g., buffer). In further aspects, the input variables may include the time period, T, before an actual secondary cell group radio link failure condition.

After the machine learning model predicts when the SCG failure will occur (e.g., T slots in the future), according to aspects of the present disclosure, the UE stops transmitting uplink data on the SCG. The UE then moves uplink traffic to the MCG. Similarly, the base station does not transmit downlink data on the SCG and moves any downlink traffic to the MCG. The data may be rerouted immediately after receiving the alert or may be rerouted a short time thereafter.

The network declares radio link failure for the SCG. In some aspects, the declaration may occur during the time period, T, after receiving the alert from the UE. In other aspects, the network declares RLF before the time period, T, elapses.

Aspects of the present disclosure benefit the UE by avoiding use of the SCG ahead of actual SCG RLF. The techniques of the present disclosure save resources associated with futile data transmission on a poor SCG link.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

The UEs 120 may include a secondary cell group (SCG) radio link failure (RLF) prediction module 140. For brevity, only one UE 120*d* is shown as including the SCG RLF prediction module 140. The SCG RLF prediction module 140 may set up a secondary cell group with a second radio access technology (RAT) that differs from a first RAT associated with a master cell group. The SCG RLF prediction module 140 may also communicate wirelessly via the secondary cell group and the master cell group, predict SCG RLF and route data transmission from the SCG to the MCG after predicting the SCG RLF.

As indicated above, FIG. 1 is provided merely as an example. Other examples may differ from what is described with regard to FIG. 1.

Figure 2:
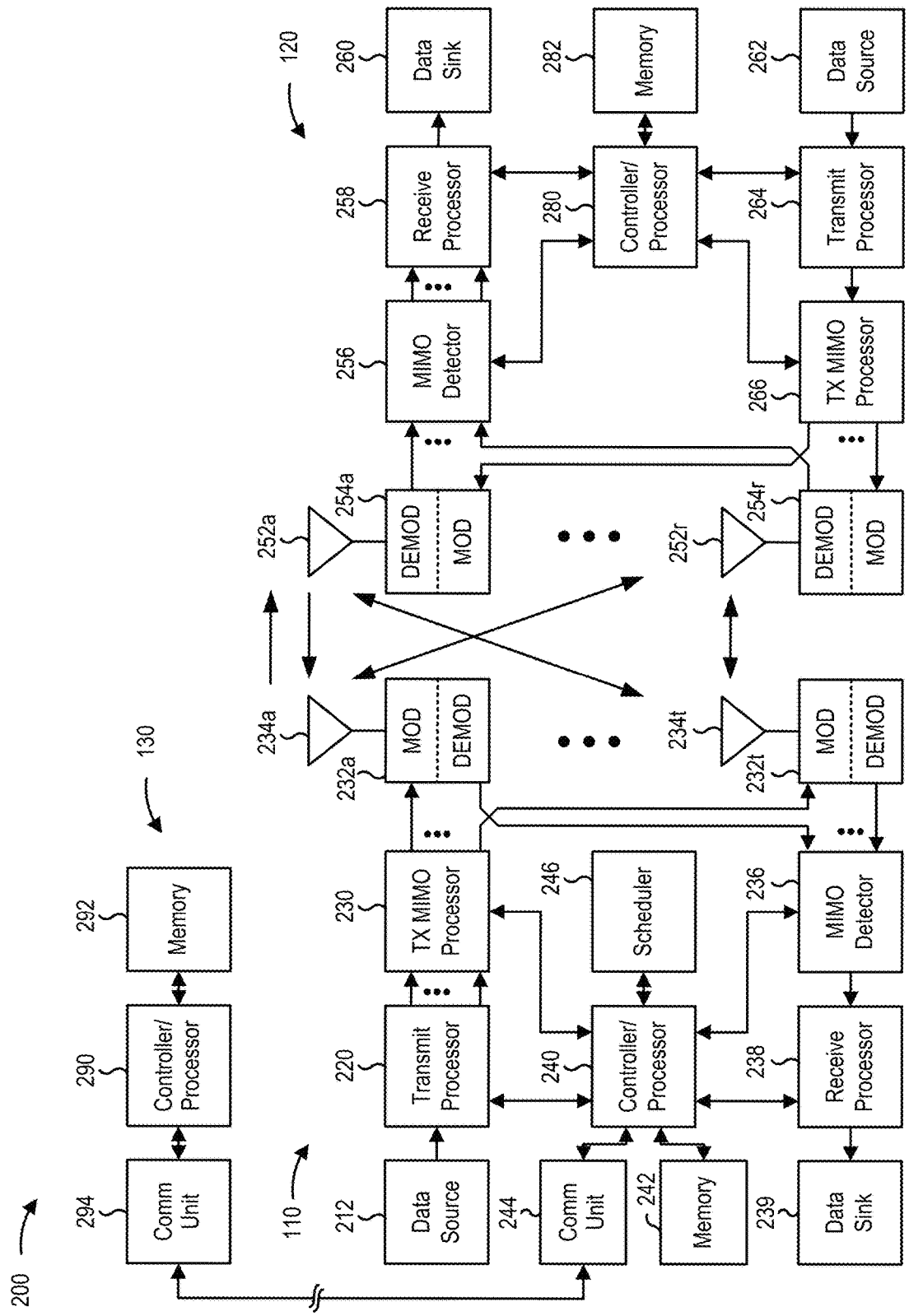
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for predicting radio link failure (RLF) as described in more detail elsewhere. For example, the controller/processor 240 of the base station 110, the controller/processor 280 of the UE 120, and/or any other component(s) of FIG. 2 may perform or direct operations of, for example, the process 900 of FIG. 9 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for setting up, means for communicating, means for predicting, means for routing, means for scheduling, and/or means for transmitting. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
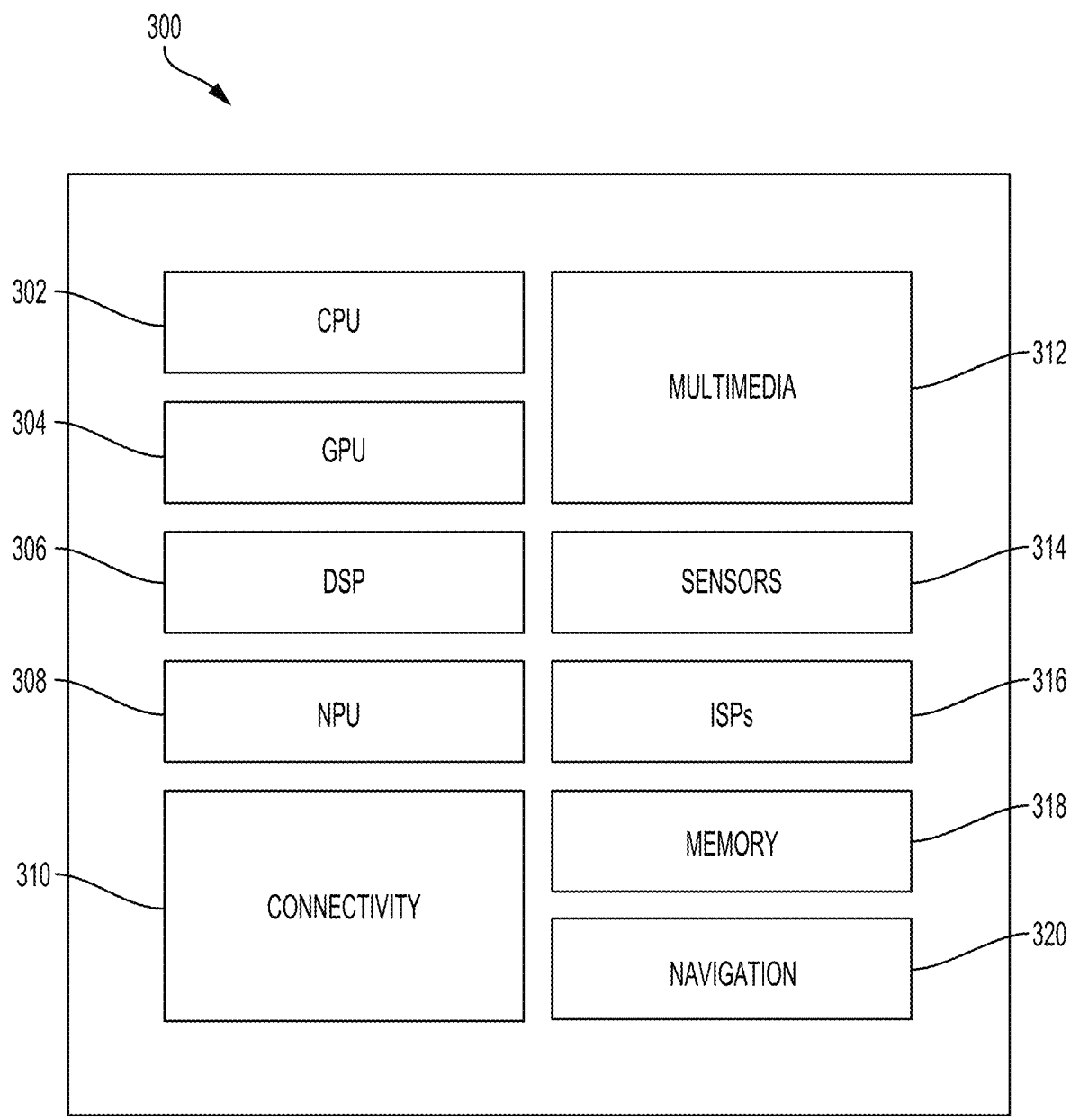
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to set up a secondary cell group with a second radio access technology (RAT) that differs from a first RAT associated with a master cell group. The general-purpose processor 302 may also comprise code to communicate wirelessly via the secondary cell group and the master cell group. The general-purpose processor 302 may further comprise code to predict a radio link failure (RLF) for the secondary cell group based on multiple inputs to a machine learning model. The general-purpose processor 302 may still further comprise code to route data transmission from the secondary cell group to the master cell group, after predicting the RLF.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
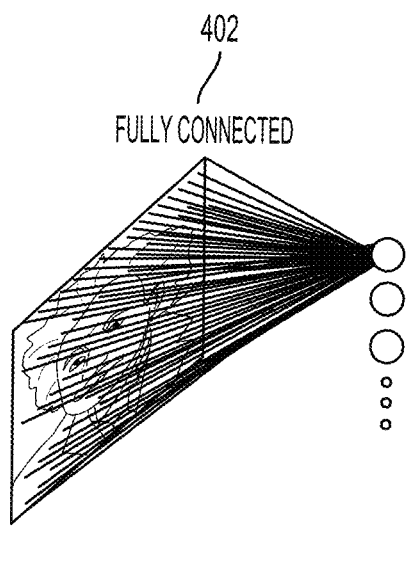
FIGS. 4A, 4B, and 4C are diagrams illustrating a neural network, in accordance with aspects of the present disclosure.
Figure 4B:
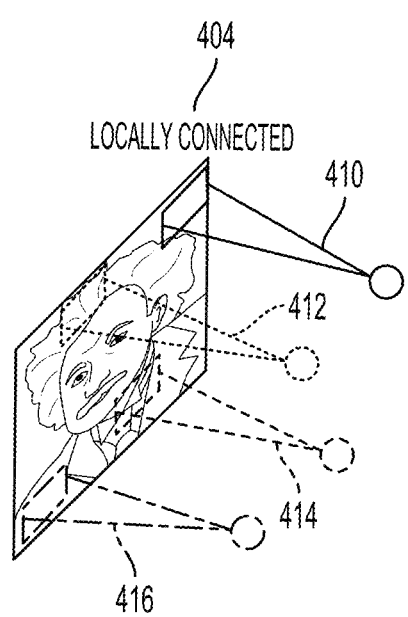

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
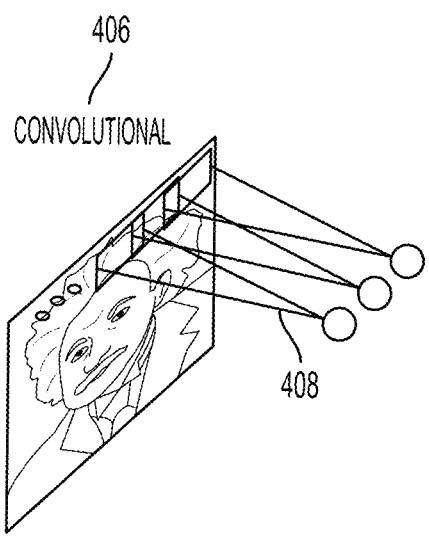

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
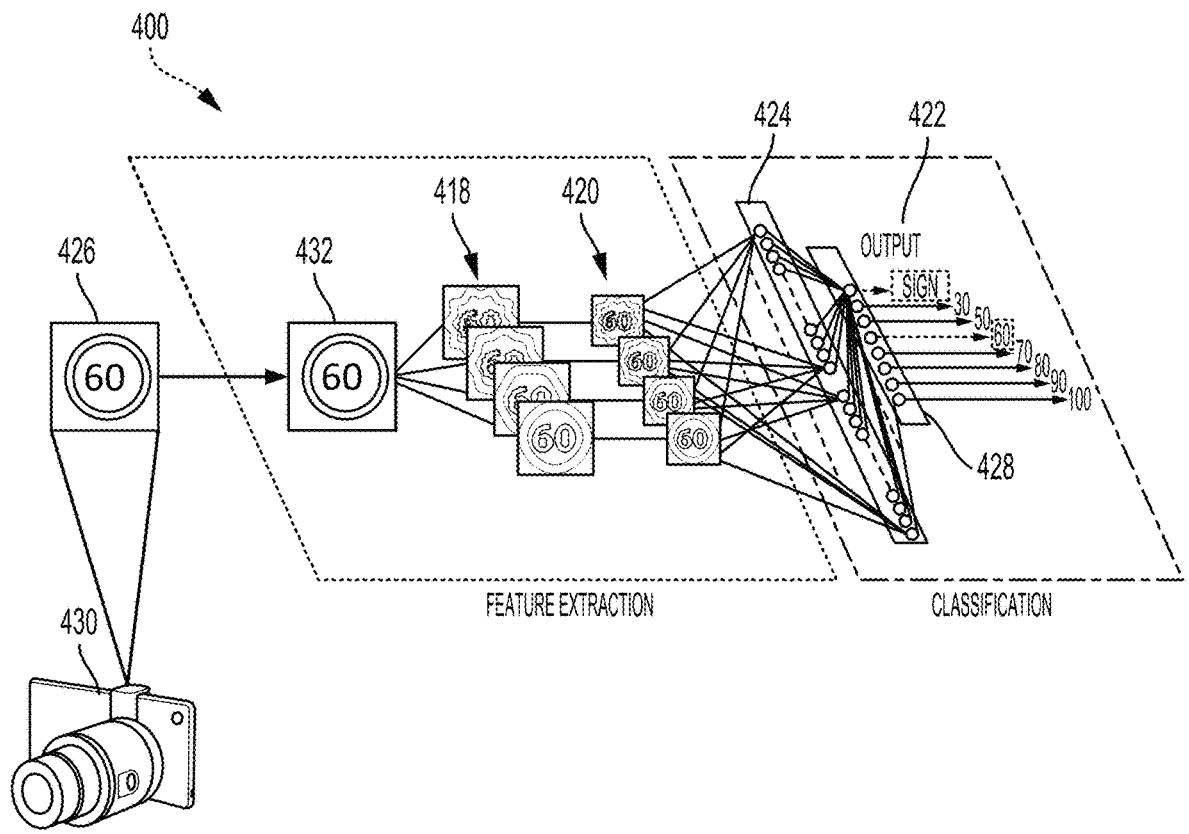
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
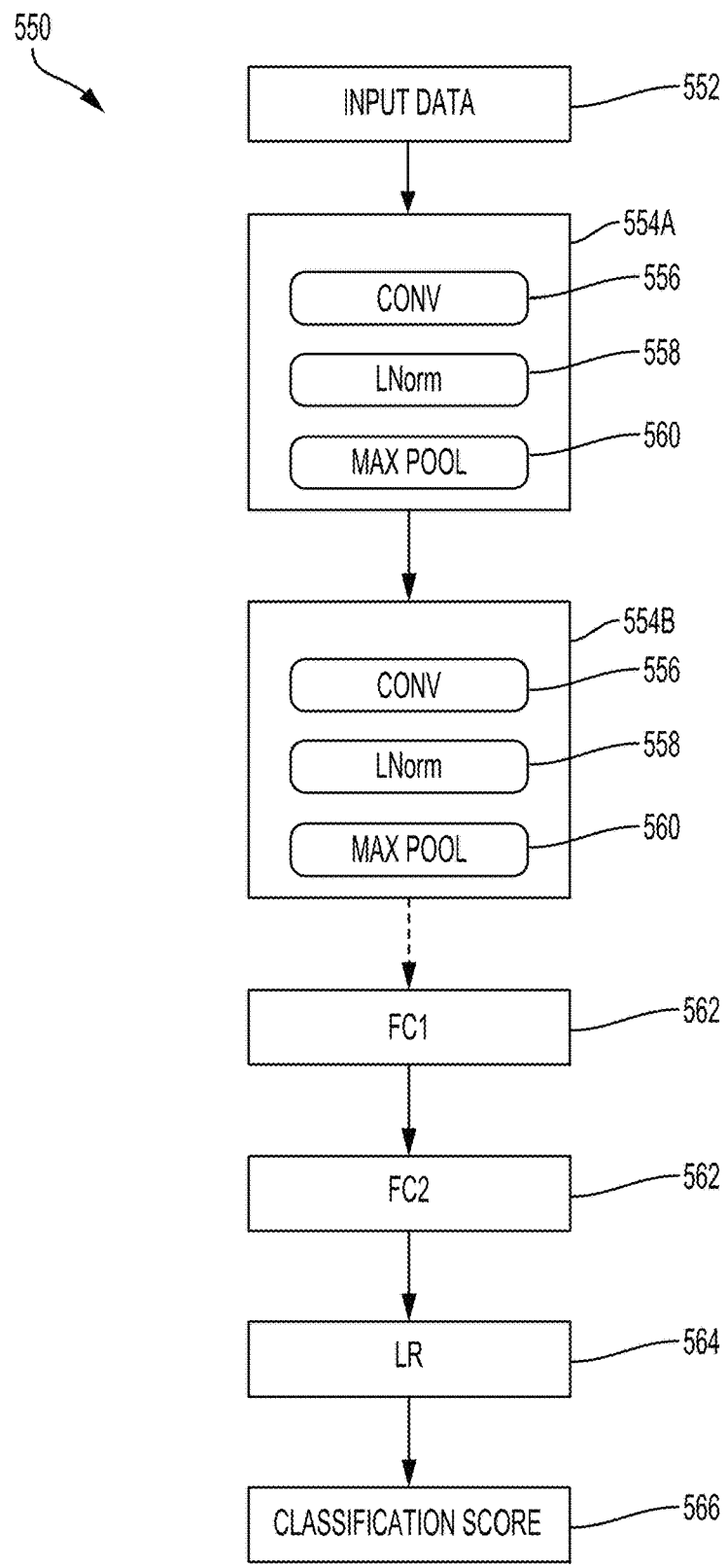
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

In a 5G non-standalone (NSA) architecture, a UE may set up a secondary cell group (SCG) to allow mobile devices to simultaneously use two different radio access technologies. For example, the UE may communicate with both a 4G network and a 5G network in an evolved universal mobile telecommunications service (UMTS) terrestrial radio access network (E-UTRAN) new radio-dual connectivity (EN-DC) architecture. A long term evolution (LTE) base station may operate as part of a master cell group (MCG) and a new radio (NR) base station may operate as part of a secondary cell group. By setting up the SCG, the UE may send and receive data on the 5G link in addition to the 4G link.

Figure 6:
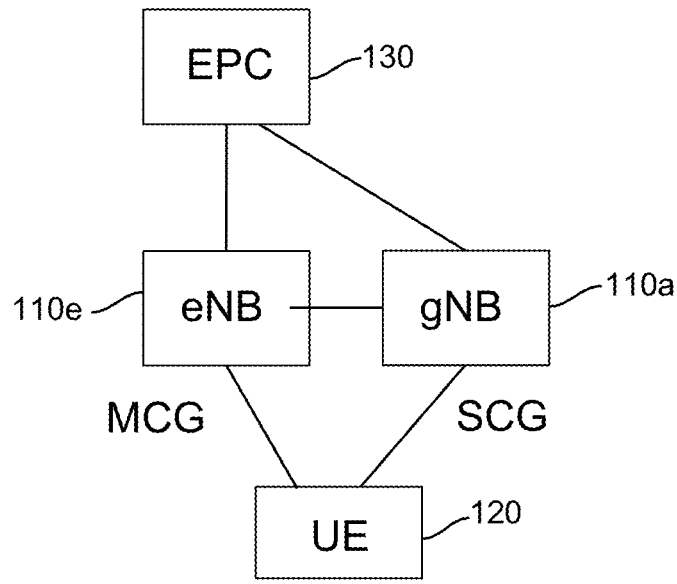
FIG. 6 is a block diagram illustrating an example of dual connectivity, in accordance with various aspects of the present disclosure.

FIG. 6 is a block diagram illustrating an example of dual connectivity, in accordance with various aspects of the present disclosure. In the example of FIG. 6, a UE 120 communicates with a base station (e.g., eNB) 110e in a master cell group (MCG). The UE 120 sets up a connection to a base station (gNB) 110a in a secondary cell group (SCG) to enable dual connectivity. Both the MCG base station 110e and the SCG base station 110a communicate with a network controller 130 of a core network, such as an evolved packet core (EPC).

When a link in the secondary cell group is unreliable, for example, due to use of millimeter wave frequencies or a poor wireless environment, data transmission may suffer from a high error rate, such as a high block error rate (BLER). As a result, numerous retransmissions of unsuccessfully decoded data are sent, which may waste UE power and processing resources when communicating with the secondary cell group.

Currently, mechanisms are provided to detect secondary cell group failure and declare secondary cell group radio link failure (RLF). For example, 3GPP standards specify a signal strength threshold and a timer. When a signal strength falls below the threshold value for a duration of the timer, RLF is declared. Similarly, when a maximum number of radio link controller (RLC) retransmissions is reached, RLF may be declared. It would be desirable for secondary cell group failure to be detected before actual failure, so traffic may be moved to a master cell group in advance of RLF.

According to aspects of the present disclosure, a UE predicts RLF before a secondary cell group RLF condition occurs, for example, as specified by the standards. The UE may predict with machine learning techniques, such as those described with respect to FIGS. 3-5. Based on the prediction, the UE may signal the potential RLF condition to the network. The UE may also proactively reroute traffic from the SCG to the MCG, in response to the prediction. The prediction may occur a period of time, T, in advance of when the RLF will actually occur. The value of the period of time, T, may be expressed as a number of slots (e.g., five slots) or an amount of time (e.g., 50 ms).

Figure 7:
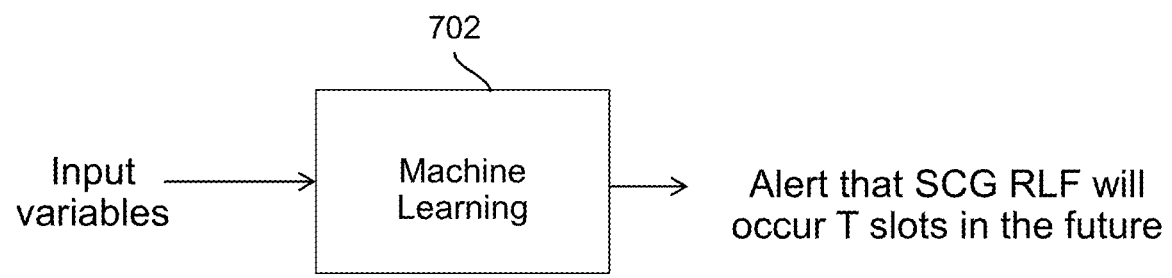
FIG. 7 is a block diagram illustrating an example of secondary cell group (SCG) radio link failure (RLF) prediction, in accordance with various aspects of the present disclosure.

FIG. 7 is a block diagram illustrating an example of secondary cell group (SCG) radio link failure (RLF) prediction, in accordance with various aspects of the present disclosure. In the example of FIG. 7, a machine learning model 702 (such as the deep convolutional network 550 of FIG. 5) receives input variables. Based on input variables, the machine learning model 702 predicts whether a secondary cell group RLF will occur at a time in the future. The machine learning model 702 generates an alert based on the prediction.

For example, the input variables of the machine learning model 702 may include a downlink block error rate (BLER) for the last D time slots, where D is a moving window. In some aspects, the block error rate may be a physical downlink shared channel (PDSCH) initial block error rate before hybrid automatic repeat request (HARQ) retransmission. In other aspects, the block error rate may be a PDSCH residual block error rate after HARQ retransmission. The input variables of the machine learning model 702 may include an uplink block error rate in the last D time slots, where the moving window is the same or different from the moving window associated with the downlink block error rate.

The input variables of the machine learning model 702 may also include a current packet data convergence protocol (PDCP) number of holes in the receive window. For example, some PDCP packet numbers, which are sequential, may be missing at the receiver. For example, the UE may have received packets one and five, while packets two, three, and four are missing. The missing packets may be referred to as a 'hole' in the receive window.

Another input variable of the machine learning model 702 may be a number of PDCP reordering timer expiration events that have occurred in the last D time slots. Referring to the previous example, the UE may wait, a time period, for the missing packets, (e.g., packets two, three, and four). The time period corresponding to the PDCP reordering timer. The number of times the PDCP reordering timer expires over a period of time (e.g., the last D time slots) may be input to the machine learning model 702.

According to further aspects of the present disclosure, the input variables of the machine learning model 702 may include a mean delay of radio link control (RLC) acknowledgements to new packet transmissions, in the last D time slots. For example, acknowledgements received more quickly may indicate a better channel than one in which the acknowledgments are received more slowly.

In still further aspects, the input variables of the machine learning model 702 may reflect a downlink control information (DCI) miss rate. That is, a DCI message may include an uplink grant or a downlink grant. Grants may be missed because an error rate is too high. A UE may detect a grant has been missed by checking a redundancy version (RV) associated with a received grant. For example, if a grant with RV=2 is received first, the UE may conclude that the grants with RV=1 and RV=0 have been missed. A higher DCI miss rate indicates an increased possibility of SCG RLF.

In yet other aspects, the input variables of the machine learning model 702 may reflect signal statistics, such as signal strength statistics or signal quality statistics. For example, a reference signal receive power (RSRP) trend, or signal-to-noise ratio (SINR) trend for a synchronization signal block (SSB) or tracking reference signal (TRS) may indicate whether SCG RLF is likely. If the RSRP is improving, SCG RLF may be less likely. If the RSRP is deteriorating quickly (e.g., a steep gradient) SCG RLF may be more likely.

In still further aspects, the input variables of the machine learning model 702 may correspond to a radio link management (RLM) timer along with an InSync count and an OutOfSync count. An InSync condition occurs when a signal is above a threshold. An OutOfSync condition occurs when a signal is below a threshold. If a number of OutOfSync events is greater than a threshold when the RLM timer expires, an SCG RLF may be declared. For example, if the threshold is 50 and 55 OutOfSync events have occurred when the timer expires, SCG RLF may be declared. However, if the OutOfSync count is high, but still below the threshold, e.g., 30, and the RLM timer has been running for period of time but has not yet expired, the SCG RLF may be considered to be more likely to occur. This information can help with predicting SCG RLF. Moreover, if a number of InSync events is high, this may indicate that SCG RLF is not likely.

In further aspects, the input variables of the machine learning model 702 may be based on scheduling request (SR) retransmission rate statistics. For example, if a number of SR retransmissions is higher than average, an SCG RLF may be considered to be more likely.

Cell history metrics may also be input to the machine learning model 702. For example, if SCG RLF was encountered when camping on the same cell previously, with the same serving cell and/or neighbor cell measurements, SCG RLF may be likely in that same cell when the UE sees the measurements in the same range. On the other hand, if the UE is camping on the same cell and seeing the same measurements but the channel appears to be good, the machine learning model 702 may be updated with this information.

Timing advance values may be input to the machine learning model 702. Timing advance is a proxy for approximate distance between the UE and the base station. If the timing advance is large, the UE may be further from the base station and SCG RLF may be more likely.

In still further aspects, the input variables of the machine learning model 702 may relate to stalling of data transmission. For example, the UE may not be able to send uplink data or the UE may receive out of sequence downlink data that is not ready for processing by upper layers. If the primary path is the SCG and the data cannot be sent (e.g., data is stalled) this information may be an indication of SCG RLF and may be input to the machine learning model 702.

Data related to movement of the UE may also be input to the machine learning model 702. The mobility data may be available from inertial sensor or GPS sensors, for example. When the UE is moving quickly, for example while driving or riding on a high speed train, SCG RLF is more likely.

According to further aspects of the present disclosure, the input variables of the machine learning model 702 may further include downlink throughput and/or uplink throughput metrics. The input variables may also include a number of RLC retransmissions sent on the uplink. The input variables may also include a number of RLC negative acknowledgements (NACKs) sent for downlink data and/or RLC NACKs received for uplink data.

In still other aspects, the input variables include a number of packets in a transmit window (e.g., buffer) and/or a receive window (e.g., buffer). For example, because packets are not flushed from a receive window until either RLC acknowledgments (ACKs) are received or a timer expires, a large number of packets in the receive window indicates a poor link. Smooth transmission over a good link would be indicated by the number of packets in the window being small.

In still further aspects, the input variables may include the time setting value, T, before an actual secondary cell group radio link failure condition. In other words, the amount of time ahead, T, the UE is predicting RLF may be input to the machine learning model 702.

After the machine learning model 702 predicts when the SCG failure will occur (e.g., T slots in the future), according to aspects of the present disclosure, the UE stops transmitting uplink data on the SCG. The UE then moves uplink traffic to the MCG. Similarly, the base station does not transmit downlink data on the SCG and moves any downlink traffic to the MCG.

Figure 8:
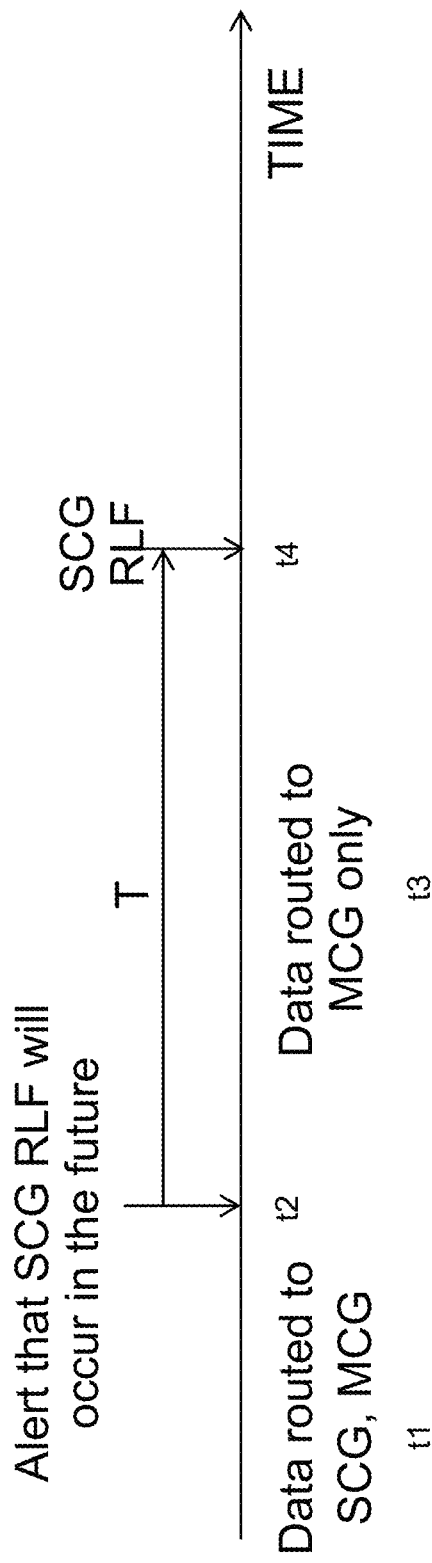
FIG. 8 is a timeline illustrating an example of data routing based on a secondary cell group (SCG) radio link failure (RLF) prediction, in accordance with various aspects of the present disclosure.

FIG. 8 is a timeline illustrating an example of data routing based on a SCG RLF prediction, in accordance with various aspects of the present disclosure. Initially, at time t1, data is routed via the SCG and the MCG. At time t2, the machine learning model (e.g., 702) predicts that SCG RLF will occur at a time in the future. The UE also generates an alert. In response to the alert, the UE routes data to the MCG at time t3, and also stops sending data to the SCG. The data may be rerouted immediately after receiving the alert or may be rerouted a short time thereafter. At time t4, a base station of the MCG declares radio link failure for the SCG in response to receiving a radio resource control (RRC) message from the UE. In some aspects, the declaration may occur during the time period, T, after receiving the alert from the UE. In other aspects, the base station declares RLF before the time period, T, elapses. In other words, the base station declares RLF early. The MCG base station may declare RLF by transmitting a control message to the SCG base station to release the SCG base station, or the MCG base station may decide to handover the SCG communications to a new SCG base station, which may release the former SCG base station and add the new SCG base station.

Aspects of the present disclosure benefit the UE by avoiding use of the SCG ahead of actual SCG RLF. The techniques of the present disclosure save resources associated with futile data transmissions on a poor SCG link.

Figure 9:
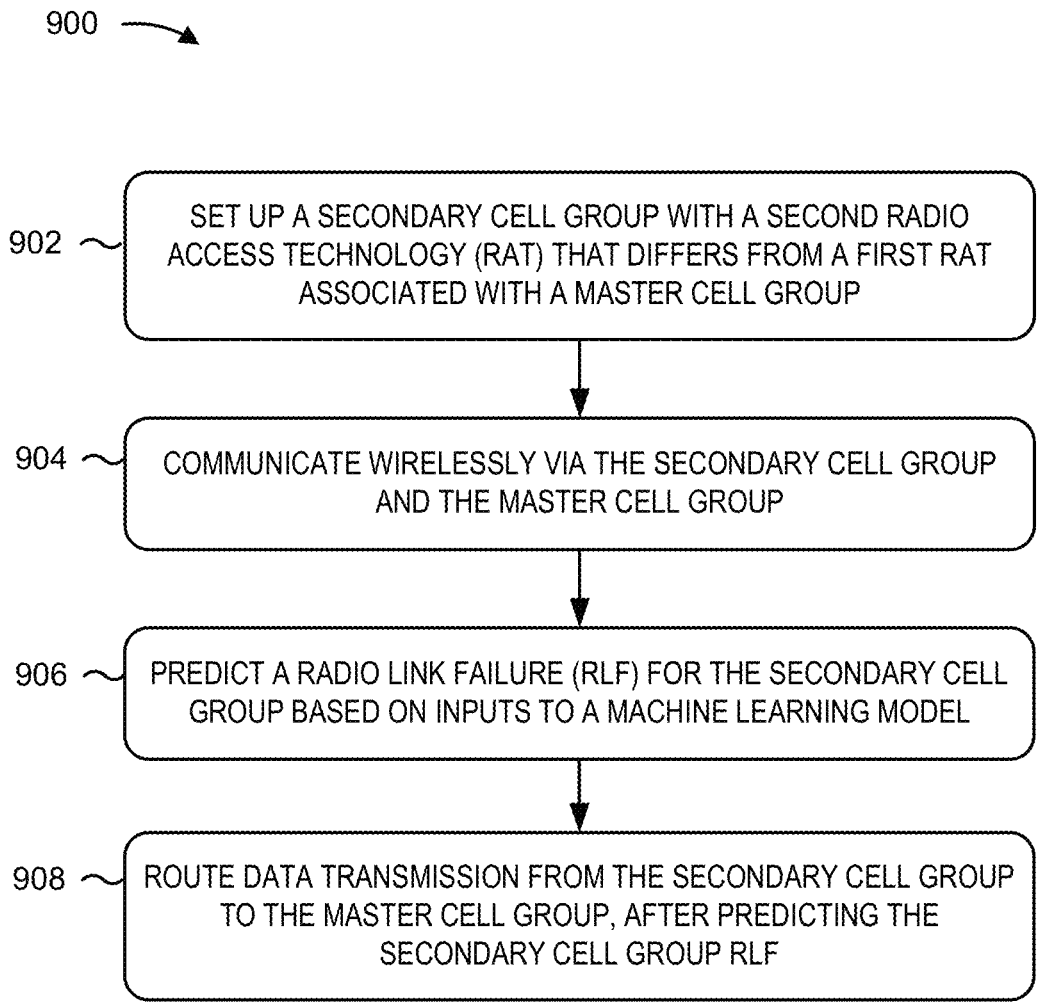
FIG. 9 is a flow diagram illustrating an example process performed, for example, by a user equipment (UE), in accordance with various aspects of the present disclosure.

FIG. 9 is a flow diagram illustrating an example process 900 performed, for example, by a user equipment (UE), in accordance with various aspects of the present disclosure. The example process 900 is an example of secondary cell group (SCG) failure prediction and traffic distribution. The operations of the process 900 may be implemented by a UE 120.

At block 902, the user equipment (UE) sets up a secondary cell group with a second radio access technology (RAT) that differs from a first RAT associated with a master cell group. For example, the UE (e.g. using the antenna 252, DEMOD/MOD 254, MIMO detector 256, receive processor 258, TX MIMO processor 266, transmit processor 264, controller/processor 280, and/or memory 282) may set up the SCG. At block 904, the user equipment (UE) communicates wirelessly via the secondary cell group and the master cell group. For example, the UE (e.g. using the antenna 252, DEMOD/MOD 254, MIMO detector 256, receive processor 258, TX MIMO processor 266, transmit processor 264, controller/processor 280, and/or memory 282) may communicate wirelessly. The communications may be via both he MCG and the SCG.

At block 906, the user equipment (UE) predicts a radio link failure (RLF) for the secondary cell group based on multiple inputs to a machine learning model. For example, the UE (e.g. using the controller/processor 280, and/or memory 282) may predict the RLF. The predicting may occur a number of slots in the future. In some aspects, the inputs may be uplink and/or downlink error rate, a number of missing sequence packets, a number of packet reordering timer expiation events, an amount of delay for ACK packets, a uplink throughput, and/or a downlink throughput. In other aspects, the inputs may be a number of uplink retransmissions, a number of NACKs transmitted and/or received, a number of packets in a buffer, how much time between a predicted SCG RLF and the prediction, and/or a DCI miss rate. In still other aspects, the inputs may include signal statistics, RLM timer data, InSync counts, OutOfSync counts, and/or SR retransmission rate statistics. In further aspects, the inputs may include cell history metrics, timing advance values, data stalling information, and/or UE mobility data.

At block 908, the user equipment (UE) routes data transmission from the secondary cell group to the master cell group, after predicting the RLF. For example, the UE (e.g. using the antenna 252, DEMOD/MOD 254, MIMO detector 256, receive processor 258, TX MIMO processor 266, transmit processor 264, controller/processor 280, and/or memory 282) may route data transmissions after the predicted RLF for the secondary cell group. The newly routed communications are via the MCG.

Example Aspects

Aspect 1: A method of wireless communication, by a user equipment (UE), comprising: setting up a secondary cell group with a second radio access technology (RAT) that differs from a first RAT associated with a master cell group; communicating wirelessly via the secondary cell group and the master cell group; predicting a radio link failure (RLF) for the secondary cell group based on a plurality of inputs to a machine learning model; and routing data transmission from the secondary cell group to the master cell group, after the predicting of the RLF for the secondary cell group.

Aspect 2: The method of Aspect 1, in which the predicting of the RLF for the secondary cell group comprises predicting that the RLF will occur a quantity of slots after a current time.

Aspect 3: The method of Aspect 1 or 2, in which the plurality of inputs comprise an uplink error rate for a first quantity of recent time slots and/or a downlink error rate for a second quantity of recent time slots.

Aspect 4: The method of any of the preceding Aspects, in which the plurality of inputs comprise a quantity of missing packet sequence numbers.

Aspect 5: The method of any of the preceding Aspects, in which the plurality of inputs comprise a quantity of packet reordering timer expiration events that occurred in a quantity of recent time slots.

Aspect 6: The method of any of the preceding Aspects, in which the plurality of inputs comprise an amount of delay for acknowledgment packets in a quantity of recent time slots.

Aspect 7: The method of any of the preceding Aspects, in which the plurality of inputs comprise an uplink throughput and/or downlink throughput.

Aspect 8: The method of any of the preceding Aspects, in which the plurality of inputs comprise a quantity of uplink retransmissions.

Aspect 9: The method of any of the preceding Aspects, in which the plurality of inputs comprise a first quantity of negative acknowledgements (NACKs) transmitted for downlink data and/or a second quantity of NACKs received for uplink data.

Aspect 10: The method of any of the preceding Aspects, in which the plurality of inputs comprise a first quantity of packets in an uplink buffer and/or a second quantity of packets in a downlink buffer.

Aspect 11: The method of any of the preceding Aspects, in which the plurality of inputs comprise a length of time between predicting the RLF and when the RLF is expected.

Aspect 12: The method of any of the preceding Aspects, in which the plurality of inputs comprise a downlink control information (DCI) miss rate.

Aspect 13: The method of any of the preceding Aspects, in which the plurality of inputs comprise signal statistics.

Aspect 14: The method of any of the preceding Aspects, in which the plurality of inputs comprise radio link monitoring (RLM) timer data, InSync counts and/or OutOfSync counts.

Aspect 15: The method of any of the preceding Aspects, in which the plurality of inputs comprise scheduling request (SR) retransmission rate statistics.

Aspect 16: The method of any of the preceding Aspects, in which the plurality of inputs comprise cell history metrics.

Aspect 17: The method of any of the preceding Aspects, in which the plurality of inputs comprise timing advance values.

Aspect 18: The method of any of the preceding Aspects, in which the plurality of inputs comprise data stalling information.

Aspect 19: The method of any of the preceding Aspects, in which the plurality of inputs comprise UE mobility data.

Aspect 20: The method of any of the preceding Aspects, further comprising transmitting, to a base station, an indication of a potential RLF based upon the predicting of the RLF.

Aspect 21: An apparatus for wireless communication, by a user equipment (UE), comprising: a memory; and at least one processor coupled to the memory, the at least one processor configured: to set up a secondary cell group with a second radio access technology (RAT) that differs from a first RAT associated with a master cell group; to communicate wirelessly via the secondary cell group and the master cell group; to predict a radio link failure (RLF) for the secondary cell group based on a plurality of inputs to a machine learning model; and to route data transmission from the secondary cell group to the master cell group, after the predicting of the RLF for the secondary cell group.

Aspect 22: The apparatus of Aspect 21, in which the at least one processor is further configured to predict the RLF for the secondary cell group by predicting that the RLF will occur a quantity of slots after a current time.

Aspect 23: The apparatus of Aspect 21 or 22, in which the plurality of inputs comprise an uplink error rate for a first quantity of recent time slots and/or a downlink error rate for a second quantity of recent time slots.

Aspect 24: The apparatus of any of the Aspects 21-23, in which the plurality of inputs comprise a quantity of missing packet sequence numbers.

Aspect 25: The apparatus of any of the Aspects 21-24, in which the plurality of inputs comprise a quantity of packet reordering timer expiration events that occurred in a quantity of recent time slots.

Aspect 26: The apparatus of any of the Aspects 21-25, in which the plurality of inputs comprise an amount of delay for acknowledgment packets in a quantity of recent time slots.

Aspect 27: The apparatus of any of the Aspects 21-26, in which the plurality of inputs comprise an uplink throughput and/or downlink throughput.

Aspect 28: The apparatus of any of the Aspects 21-27, in which the plurality of inputs comprise a quantity of uplink retransmissions.

Aspect 29: The apparatus of any of the Aspects 21-28, in which the plurality of inputs comprise a first quantity of negative acknowledgements (NACKs) transmitted for downlink data and/or a second quantity of NACKs received for uplink data.

Aspect 30: The apparatus of any of the Aspects 21-29, in which the plurality of inputs comprise a first quantity of packets in an uplink buffer and/or a second quantity of packets in a downlink buffer.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, by a user equipment (UE), comprising:
    setting up a secondary cell group with a second radio access technology (RAT) that differs from a first RAT associated with a master cell group;
    communicating wirelessly via the secondary cell group and the master cell group;
    predicting a radio link failure (RLF) for the secondary cell group based on a plurality of inputs to a machine learning model, the plurality of inputs comprising at least one of a mean delay of radio link control (RLC) acknowledgment packets to new packet transmissions in a quantity of recent time slots, or scheduling request (SR) retransmission rate statistics; and
    routing data transmission from the secondary cell group to the master cell group, after the predicting of the RLF for the secondary cell group.

2. The method of claim 1, in which the predicting of the RLF for the secondary cell group comprises predicting that the RLF will occur a quantity of slots after a current time.

3. The method of claim 1, in which the plurality of inputs comprise an uplink error rate for a first quantity of recent time slots and/or a downlink error rate for a second quantity of recent time slots.

4. The method of claim 1, in which the plurality of inputs comprise a quantity of missing packet sequence numbers.

5. The method of claim 1, in which the plurality of inputs comprise a quantity of packet reordering timer expiration events that occurred in a quantity of recent time slots.

6. The method of claim 1, in which the plurality of inputs comprise an uplink throughput and/or downlink throughput.

7. The method of claim 1, in which the plurality of inputs comprise a quantity of uplink retransmissions.

8. The method of claim 1, in which the plurality of inputs comprise a first quantity of negative acknowledgements (NACKs) transmitted for downlink data and/or a second quantity of NACKs received for uplink data.

9. The method of claim 1, in which the plurality of inputs comprise a first quantity of packets in an uplink buffer and/or a second quantity of packets in a downlink buffer.

10. The method of claim 1, in which the plurality of inputs comprise a length of time between predicting the RLF and when the RLF is expected.

11. The method of claim 1, in which the plurality of inputs comprise a downlink control information (DCI) miss rate.

12. The method of claim 1, in which the plurality of inputs comprise signal statistics.

13. The method of claim 1, in which the plurality of inputs comprise radio link monitoring (RLM) timer data, InSync counts and/or OutOfSync counts.

14. The method of claim 1, in which the plurality of inputs comprise cell history metrics.

15. The method of claim 1, in which the plurality of inputs comprise timing advance values.

16. The method of claim 1, in which the plurality of inputs comprise data stalling information.

17. The method of claim 1, in which the plurality of inputs comprise UE mobility data.

18. The method of claim 1, further comprising transmitting, to a base station, an indication of a potential RLF based upon the predicting of the RLF.

19. An apparatus for wireless communication, by a user equipment (UE), comprising:
    a memory; and
    at least one processor coupled to the memory, the at least one processor configured:
        to set up a secondary cell group with a second radio access technology (RAT) that differs from a first RAT associated with a master cell group;
        to communicate wirelessly via the secondary cell group and the master cell group;
        to predict a radio link failure (RLF) for the secondary cell group based on a plurality of inputs to a machine learning model, the plurality of inputs comprising at least one of a mean delay of radio link control (RLC) acknowledgment packets to new packet transmissions in a quantity of recent time slots, or scheduling request (SR) retransmission rate statistics; and
        to route data transmission from the secondary cell group to the master cell group, after the predicting of the RLF for the secondary cell group.

20. The apparatus of claim 19, in which the at least one processor is further configured to predict the RLF for the secondary cell group by predicting that the RLF will occur a quantity of slots after a current time.

21. The apparatus of claim 19, in which the plurality of inputs comprise an uplink error rate for a first quantity of recent time slots and/or a downlink error rate for a second quantity of recent time slots.

22. The apparatus of claim 19, in which the plurality of inputs comprise a quantity of missing packet sequence numbers.

23. The apparatus of claim 19, in which the plurality of inputs comprise a quantity of packet reordering timer expiration events that occurred in a quantity of recent time slots.

24. The apparatus of claim 19, in which the plurality of inputs comprise an uplink throughput and/or downlink throughput.

25. The apparatus of claim 19, in which the plurality of inputs comprise a quantity of uplink retransmissions.

26. The apparatus of claim 19, in which the plurality of inputs comprise a first quantity of negative acknowledgements (NACKs) transmitted for downlink data and/or a second quantity of NACKs received for uplink data.

27. The apparatus of claim 19, in which the plurality of inputs comprise a first quantity of packets in an uplink buffer and/or a second quantity of packets in a downlink buffer.

* * * * *